(12) United States Patent
Bishop

(10) Patent No.: US 8,244,299 B1
(45) Date of Patent: Aug. 14, 2012

(54) GRIP ATTACHMENT FOR A MOBILE PHONE

(76) Inventor: John Bishop, Plano, TX (US)

( * ) Notice: Subject to any disclaimer, the term of this patent is extended or adjusted under 35 U.S.C. 154(b) by 0 days.

(21) Appl. No.: 13/048,978

(22) Filed: Mar. 16, 2011

(51) Int. Cl.
*H04M 1/00* (2006.01)

(52) U.S. Cl. ............... 455/556.1; 455/550.1; 455/575.7; 439/660

(58) Field of Classification Search ............... 455/556.2, 455/550.1, 575.6; 439/660
See application file for complete search history.

(56) References Cited

U.S. PATENT DOCUMENTS

| 7,703,224 B2 * | 4/2010 | Karlsson et al. ................. 37/457 |
| 2004/0087335 A1 * | 5/2004 | Peiker ........................ 455/556.2 |
| 2009/0305572 A1 * | 12/2009 | Takamoto et al. ............ 439/660 |

* cited by examiner

*Primary Examiner* — Danh Le
(74) *Attorney, Agent, or Firm* — Michael Diaz

(57) ABSTRACT

A grip attachment for an electronic device, such as a mobile phone, which enables a user to grasp and control a camera of the mobile phone with one hand. The grip attachment includes a main body and an enlarged grip extension attached to a first end of the main body. The enlarged grip extension is sized and shaped to enable a user's hand to hold the grip extension and attached mobile phone with one hand. The grip attachment also includes a locking mechanism for attaching the attachment grip to a portion of a mobile phone protective case. A second end of the grip extension includes a connector for interfacing with a connector of the mobile phone. The grip extension includes an external control located on an outer surface of the grip attachment for activating a camera control of the mobile phone.

12 Claims, 8 Drawing Sheets

GRIP ATTACHMENT FOR A MOBILE PHONE

BACKGROUND OF THE INVENTION

1. Field of the Invention

This invention relates to mobile phone accessories. Specifically, and not by way of limitation, the present invention relates to a grip attachment providing camera control of a mobile phone.

2. Description of the Related Art

With the advent of digital cameras, photography has become more popular than ever. Digital cameras enable users to take and store many photographs. Because of their compact size, digital cameras are easy to carry, thereby allowing many people to always have quick access to their cameras. However, as popular as digital cameras have become, mobile phones with their highly capable camera functions, have literally changed photography in a completely different way. These camera phones are capable of taking high resolution photos and incorporate many photographic features found on most digital cameras. Touch screen telephones are particular popular whereby a user interfaces with the camera by using the touch screen. However, these touch screen camera phones suffer from several disadvantages. First, a user cannot easily hold a phone with just one hand when taking photographs or video segments. With touch screen phones, a user must use both hands where the user's first hand holds the camera while the user's second hand manipulates the camera functions by touching the touch screen. This is a very cumbersome process where a user typically uses both hands to take a photograph. Many traditional cameras, prior to mobile camera phones, often used a hand grip located on one side of the main body of the camera. Oftentimes, the hand grip incorporated a shutter release on the hand grip which enabled a user to grasp and take a photograph with just one hand. It would be advantageous to have an apparatus which enables a user to conveniently take a photograph or video from a mobile phone with just one hand.

There are existing phone cases which enable a user to take a photograph by depressing a button on the case. However, none of these existing cases enables a user to easily grasp the camera body and take a photograph with just one hand.

It would be advantageous to have a hand grip adapter which is easily attached to a mobile phone and enables a user to manipulate the camera functions from the hand grip without touching the touch screen. It is the object of the present invention to provide such an apparatus.

SUMMARY OF THE INVENTION

The present invention provides a grip attachment for a mobile phone which enables a user to grasps and control a camera of the mobile phone with one hand. In one embodiment, the present invention is directed to a grip attachment for a mobile phone. The grip attachment includes a main body and an enlarged grip extension attached to a first end of the main body. The enlarged grip extension is sized and shaped to enable a user's hand to hold the grip extension and attached mobile phone with one hand. The grip attachment also includes a locking mechanism for attaching the attachment grip to a portion of a mobile phone protective case. A second end of the grip extension includes a connector for interfacing with a connector of the mobile phone. The grip extension includes an external control located on an outer surface of the grip attachment for activating a camera control of the mobile phone. The external control may interface with the mobile phone by utilizing a pin connector interface, a Bluetooth interface, sound module, Infrared Interface, or any other interface allowing the grip attachment to utilize a camera control of the mobile phone.

DESCRIPTION OF THE INVENTION

Figure 1:
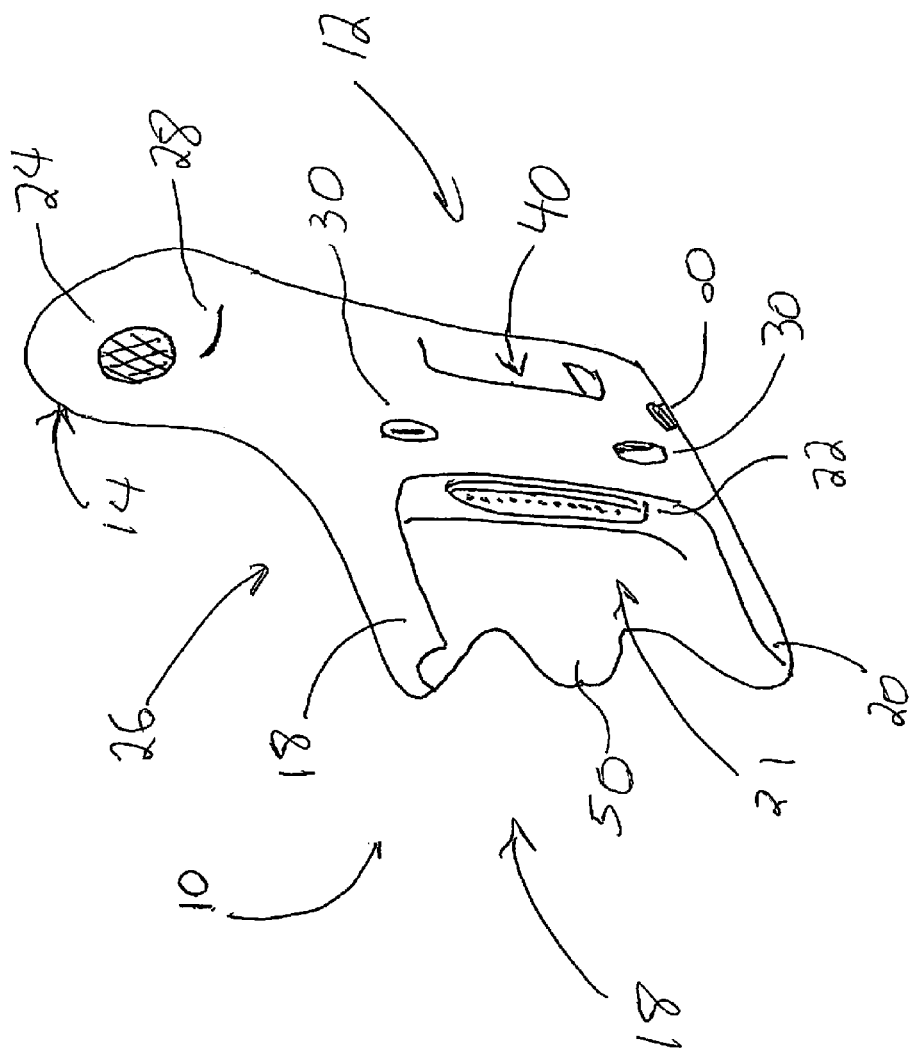
FIG. 1 is a top perspective view of a grip attachment in the preferred embodiment of the present invention.

The present invention is a grip attachment providing camera control of a mobile phone. FIG. 1 is a top perspective view of a grip attachment 10 in the preferred embodiment of the present invention. The grip attachment includes a main body 12 having an enlarged grip extension 14. The grip extension is sized and shaped to fit comfortably in a user's palm providing an enlarged surface area greater than a perimeter of a mobile phone. The grip attachment includes a slotted end 16 sized and shaped to accommodate a mobile phone upper end. The slotted end is bordered by side borders 18 and 20 and the grip extension 14. Within an interior space 20 of the slotted end is a pin connector 22 which is capable of receiving an end portion pin connector of the mobile phone. The pin connector may be any electronic pin connector, such as a standard male/female 30 pin connector utilized on many mobile phones. The grip attachment may include a shutter release button 24 located on a top side 26 of the grip extension 14. Furthermore, the grip extension may include an on/off button (not shown) and a zoom toggle switch 28.

The grip attachment 10 may also include pass through openings 30 allowing sound passage to and from the mobile phone (e.g., microphone and speaker access from the mobile phone). The openings may include a baffling chamber to enhance sound or provide external speaker operation (e.g., a megaphone effect). The grip attachment may also include a pass through pin connector (or other type of connection device) 40 enabling connection of a cable connection for charging, downloading, flashcard adapter, phone syncing, etc., without removing the grip attachment 10 from the mobile phone. The grip attachment may include a case lock mechanism 50 for attachment to a partial mobile phone case which will be discussed below. The grip attachment may also include a wrist strap/lanyard attachment mechanism 60. A lanyard may be attached to the lanyard attachment mechanism to provide ease in transporting the grip attachment and mobile phone.

The grip extension may house additional items in an interior portion. For example, the interior portion of the grip extension may include an additional battery source or storage area for accessories to the mobile phone of the grip adaptor 10.

Figure 2:
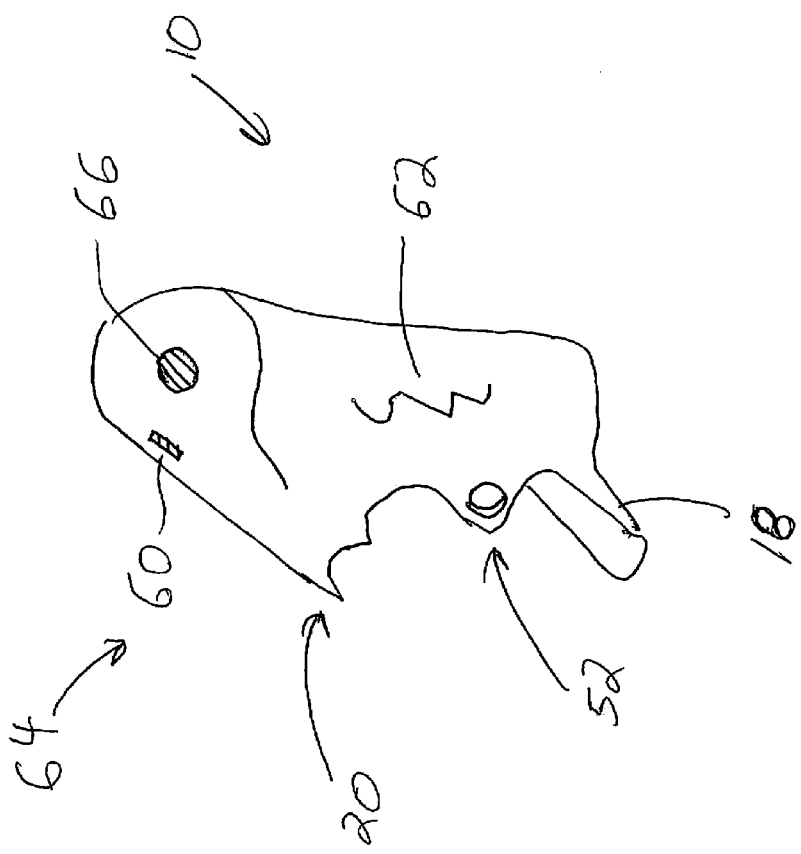
FIG. 2 is a bottom perspective view of the grip attachment of FIG. 1.

FIG. 2 is a bottom perspective view of the grip attachment 10 of FIG. 1. The grip attachment may include a grip extension outer surface 62 allowing an extended surface area to enable the user to easily grasp the grip attachment 10. The case lock mechanism 50 may also include a case lock tab 52. A bottom end 64 of the grip extension 14 may include a tri-pod screw receiver 66. A tri-pod end may be attached to the tri-pod screw receiver 66 to enable the mobile phone to be immobilized for photographs.

The grip attachment may be constructed of any rigid material which enables the user to easily grasp the grip extension 14, such as a plastic or rubberized material. The pin connector 22 enables an interface between the mobile phone and the external controls (e.g., shutter release button 24 and the zoom toggle switch 28). The mobile phone may receive a software application or "app" to provide the interface with the grip attachment. Although the grip attachment illustrates the shutter release button 24 and the zoom toggle switch 28, in other embodiments, the grip attachment may include other external control devices, such as a camera or video activation button. In an alternate embodiment, the grip attachment does not include an external controls or a pin connector 22. In addition, rather than utilizing a pin connector interface, the present invention may utilize other interface mechanisms. For example, the grip attachment may include a Bluetooth transmitter/receiver for interface with the mobile phone controls via a Bluetooth connection. In another embodiment, the grip attachment may interface with the mobile phone through an Infrared (IR) connection. In still another embodiment, the grip attachment may include a sound making module (electronic or mechanical). In this embodiment, the sound making module creates a sound which may be picked up by a microphone of the mobile phone. Upon hearing a specified sound, the mobile phone camera may take a photograph. In an electronic version of the sound making module, the sound making module may be DC powered through a pin connector arrangement or powered by a separate battery source. The mechanical interface may be any device which creates a sound (e.g., a clicker used by children). An application residing in the mobile phone may be used to match the emitted sound whereby the application reacts upon receiving a sound matching the exact frequency of the sound making module.

Figure 3:
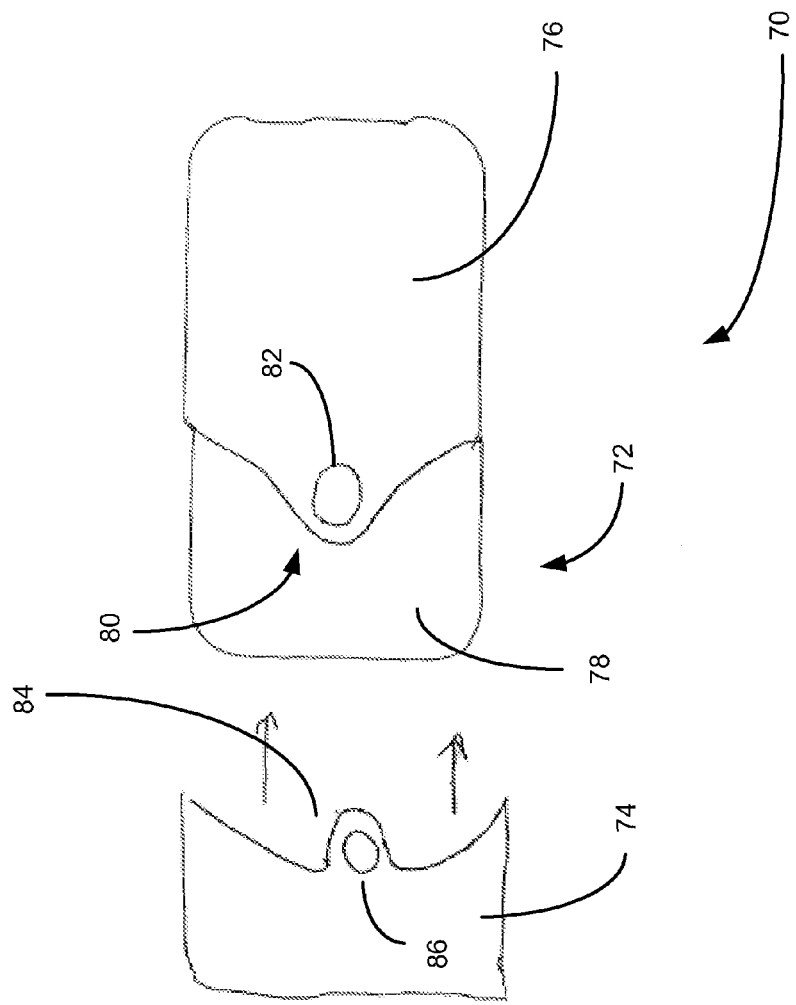
FIG. 3 (Prior Art) is a rear view of a conventional mobile phone case used in protecting a mobile phone.

FIG. 3 is a rear view of a conventional mobile phone case 70 used in protecting a mobile phone 72. The case 70 may include two portions, an upper portion 74 and a lower portion 76. The lower portion 76 covers a rear surface 78 of the mobile phone 72. The lower portion 76 may include a curved extension 80 having a tab opening 82. The upper portion 74 may include a case lock mechanism 84 having a case lock tab 86. The case lock tab is sized and shaped to fit within the tab opening 82. When the upper portion is slide onto the upper portion of the mobile phone, the case lock tab 86 is locked in place within the tab opening 82. To remove the upper portion of the case 70, the case lock tab 86 is depressed and the upper portion slide away from the lower portion.

Figure 4:
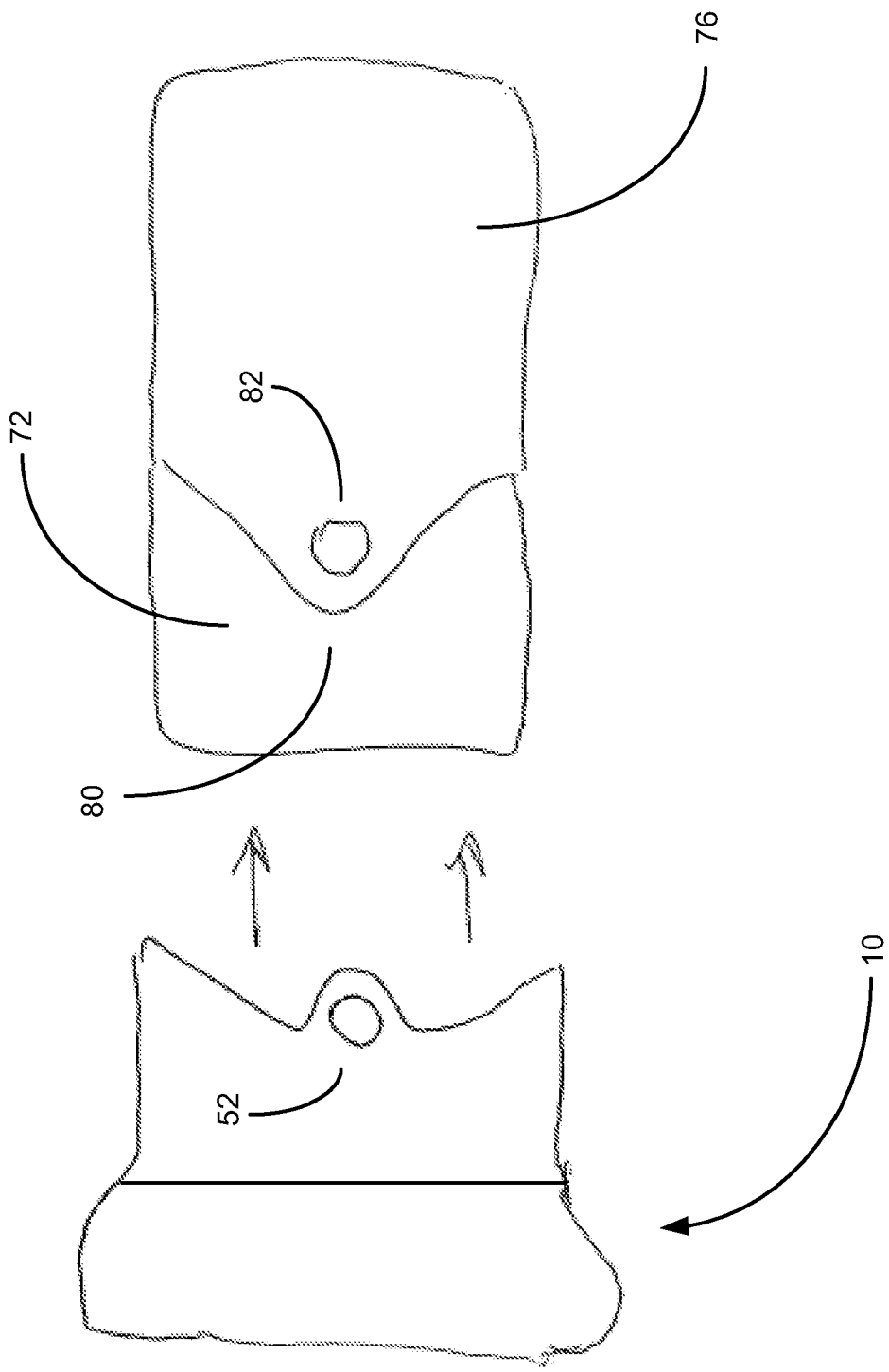
FIG. 4 is a rear view of the grip attachment and the lower portion of the case attached to the mobile phone.

FIG. 4 is a rear view of the grip attachment 10 and the lower portion 76 of the case attached to the mobile phone 72. The grip attachment may be attached to a mobile phone by using the locking mechanism 84. The grip attachment is slide onto the upper portion of the mobile phone 72 and attached to the mobile phone by the case lock tab 52 being positioned and secured in the tab opening 82 in a similar fashion that the case lock tab 86 is held in position within the tab opening 82. Once locked in place, the grip attached is securely fastened to the mobile phone and lower portion 76 of the case 70. When desired, the grip attachment may be easily removed by depressing the case lock tab 52 of the grip attachment 10 and sliding the grip attachment away from the lower portion 76. The upper portion 74 may then be replaced onto the mobile phone 72. In one embodiment, as depicted in FIGS. 2 and 4, the tab 52 and tab opening 82 are square in shape. However, in other embodiments, the tab and tab opening may be any shape, such as circular as shown in FIG. 3. Although FIGS. 1-4 illustrate using the locking mechanism of an existing case 70, the present invention may utilized any locking mechanism which may incorporating using a portion or all of a mobile phone case or may be affixed directly to the mobile phone and still remain in the scope of the present invention.

With reference to FIGS. 1-4, the operation of the grip attachment 10 will now be explained. As discussed above, the grip attachment may be attached to a portion of the case 70 of the mobile phone 72. In such an embodiment, the upper portion 74 of the mobile phone case 70 may be slid off by depressing the case lock tab 86 and removing the upper portion of the case from the mobile phone. The grip attachment may be attached to the mobile phone 70 by using the locking mechanism 84. The grip attachment is slide onto the upper portion of the mobile phone 72 and attached to the mobile phone by the case lock tab 52 being positioned and secured in the tab opening 82 in a similar fashion that the case lock tab 86 is held in position within the tab opening 82. Once locked in place, the grip attached is securely fastened to the mobile phone and lower portion 76 of the case 70. In addition, the user may quickly and easily remove the grip attachment by depressing the case lock tab 52 of the grip attachment 10 and sliding the grip attachment away from the lower portion 76. The upper portion 74 of the case may then be re-positioned onto the mobile phone 72. Although the grip attachment 10 may be attached to a portion of the mobile phone case, in other embodiments, the grip attachment may be attached directly to the mobile phone by any type of locking mechanism or directly to the case.

When the grip attachment is attached to the mobile phone, in one embodiment, an upper portion of the mobile phone 72 is positioned within the interior space 21. The pin connector of the mobile phone connects to the pin connector 22 in a type male-female pin connector interface. The mobile phone may download a software application or "app" which enables the interface of the grip attachment 10 with the mobile phone.

The user may then take photographs by utilizing the grip attachment. The grip attachment enables the user to grasp the mobile phone 72 with one hand and depress the shutter release button 24 with the same hand. By depressing the shutter release button, the mobile phone's internal camera is activated and the camera captures an image. The user, in one embodiment, may zoom in or out on an image by toggling the zoom toggle switch 28. In other embodiments, the grip attachment may include a button for activating the camera or video camera to a "live mode."

The attachment grip may include the pass through connector 40 which enables the attachment of a standard cable to the grip attachment, thereby providing a pass through connection to the mobile phone. Thus, the user may attach a cable for such actions as downloading information or computer programs from a computer, recharging the mobile phone, etc. Furthermore, the attachment grip 10 may include openings 30 which enable sound to pass to and from the mobile phone through the grip attachment 10. Additionally, the user may attach a lanyard to the lanyard attachment 60.

In one embodiment, the user may attach a tri-pod to the tri-pod screw receive 66 to allow the user to set the mobile phone on the tri-pod. Additionally, in another embodiment, the grip extension may include an interior storage area to store an addition mobile phone battery or other mobile phone accessories. In still another embodiment, the grip attachment does not include any external controls and is used only as a grip for the user. Additionally, a magnet may be installed on an outer surface of the grip attachment to allow attachment of the grip attachment to a metal surface. In one embodiment, the magnet may be incorporated with a threaded hole for attachment of the tripod to the grip attachment.

Figure 5:
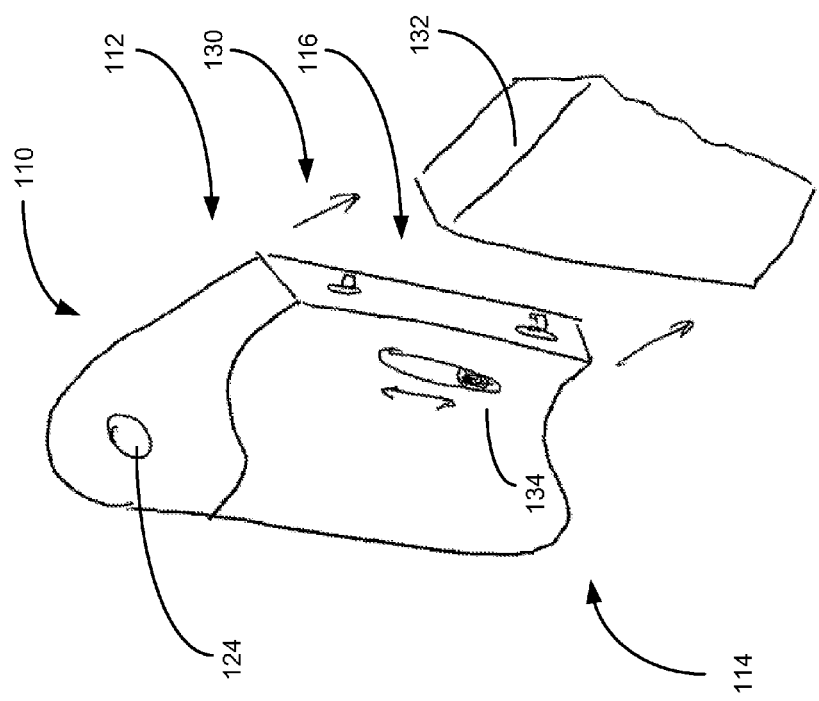
FIG. 5 is a front view illustrating a grip attachment in an alternate embodiment of the present invention; and of the case attached to the mobile phone.

FIG. 5 is a front view illustrating a grip attachment 110 in an alternate embodiment of the present invention. The grip attachment 110 includes a main body 112 and an end 116 having one or more locking tabs 118 providing a locking mechanism 130 for attachment to a mobile phone 132. The grip attachment may include a grip extension 114 having a shutter release button 124. As depicted in FIG. 5, the locking mechanism may include a slide button 134 for actuating a lock (not shown) for attaching the grip attachment 110 to the mobile phone. The grip attachment 110 may also optionally include a wrist strap/lanyard (not shown). The grip attachment 110 may have no external controls or more than one external control (e.g., shutter release button 124), such as an on/off switch to the camera function of the mobile phone. In addition, the present invention may utilize a pin connector interface or other interface mechanisms. For example, the grip attachment may include a Bluetooth transmitter/receiver for interface with the mobile phone controls via a Bluetooth connection. In another embodiment, the grip attachment may interface with the mobile phone through an Infrared (IR) connection. In still another embodiment, the grip attachment may include a sound making module (electronic or mechanical). In this embodiment, the sound making module creates a sound which may be picked up by a microphone of the mobile phone. Upon hearing a specified sound, the mobile phone camera may take a photograph.

Although not depicted in FIG. 5, the grip attachment 110 may include a zoom toggle switch, openings 30 to allow the passage of sound to and from the mobile phone and a tri-pod screw receiver 66. In addition, the grip extension 114 may house an additional power source for the mobile phone or other accessories for the mobile phone 70.

The grip attachment 110 functions in the same manner as the grip attachment 10 of FIGS. 1-4. The present invention provides an enlarged grip to enable a user to easily grasp the mobile phone for use when utilizing a camera on the mobile phone. Furthermore, the grip attachment may include a pass through connector (not shown) in a similar fashion as the pass through connector 40 of the grip attachment 10.

Figure 6:
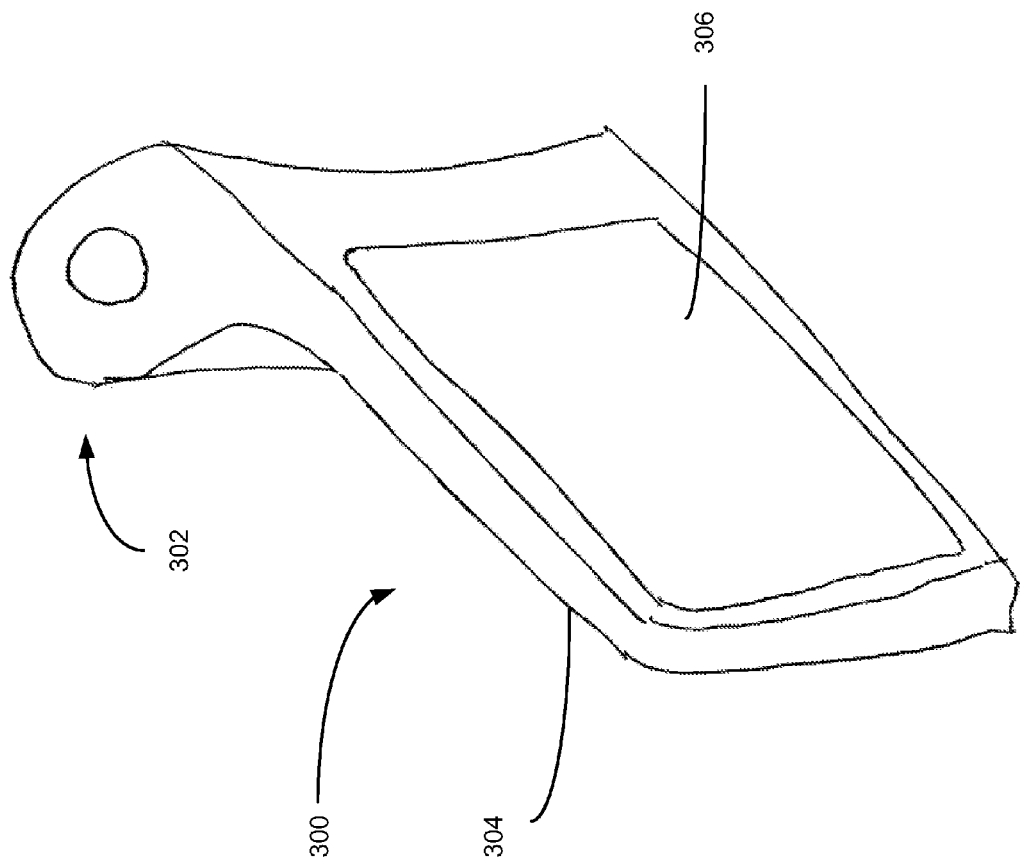
FIG. 6 is a front perspective view of a grip attachment 300 in another embodiment of the present invention.

FIG. 6 is a front perspective view of a grip attachment 300 in another embodiment of the present invention. In this embodiment, a grip extension 302 may be incorporated into a protective case 304 for a mobile phone. The grip attachment is an integral part of the case having an opening 306 for accessing the touch screen of the mobile phone. Thus, the grip attachment may not be detached from the case. The case may be a unitary configuration where a grip extension is permanently affixed to an end of the protective case. The grip attachment 300 is preferably constructed of a molded rubber or other soft yet resilient material. In addition, the present invention may utilize a pin connector interface or other interface mechanisms. For example, the grip attachment may include a Bluetooth transmitter/receiver for interface with the mobile phone controls via a Bluetooth connection. In another embodiment, the grip attachment may interface with the mobile phone through an Infrared (IR) connection. In still another embodiment, the grip attachment may include a sound making module. In this embodiment, the sound making module creates a sound which may be picked up by a micro- phone of the mobile phone. Upon hearing a specified sound, the mobile phone camera may take a photograph.

Figure 7:
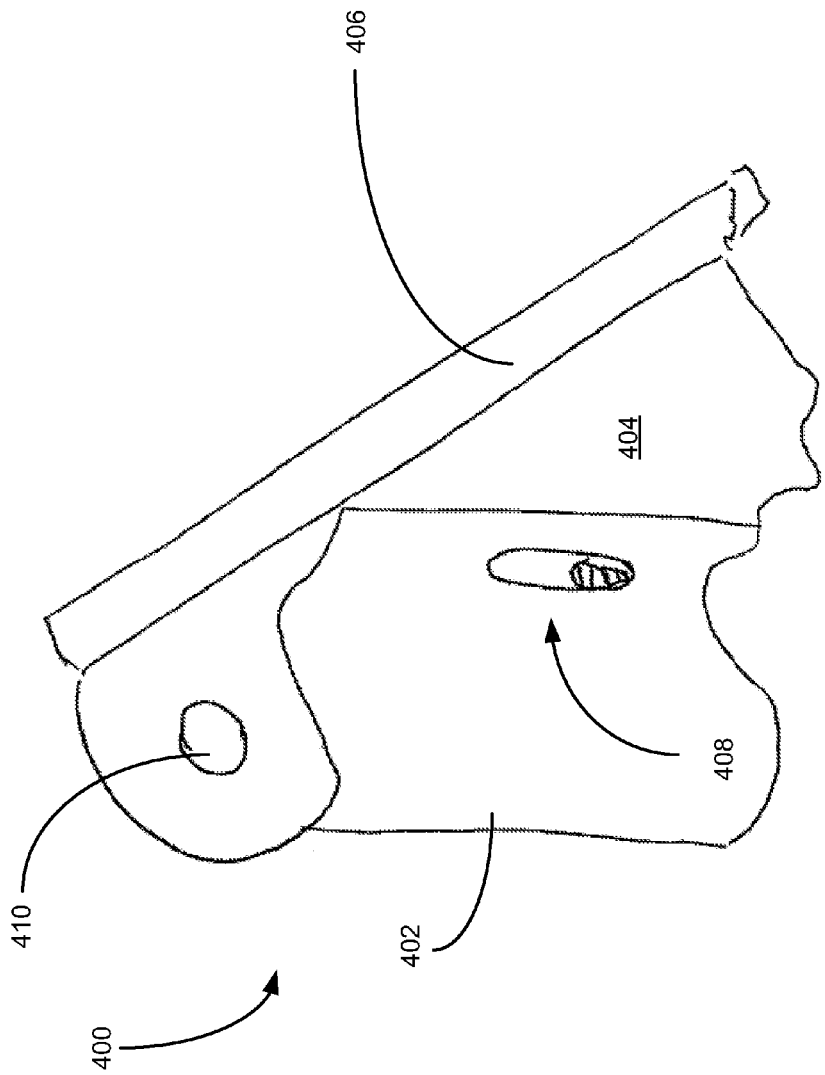
FIG. 7 is a front perspective view of a grip attachment in another embodiment of the present invention.
Figure 8:
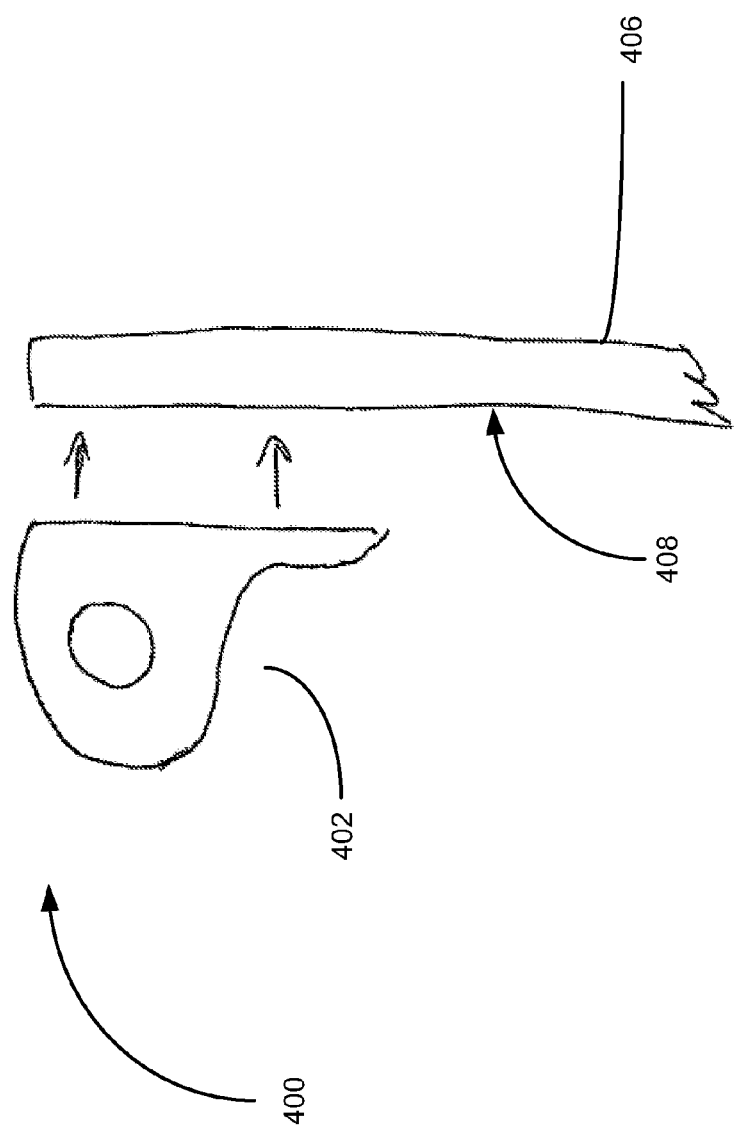
FIG. 8 is a top view of the grip extension of FIG. 7 detached from the camera case.

FIG. 7 is a front perspective view of a grip attachment 400 in another embodiment of the present invention. The grip attachment includes a grip extension 402 which is affixed to a back side 404 of a mobile phone case 406. The grip extension 402 is detachable from the mobile phone case. The grip extension may include a locking device 408 providing an attachment and locking mechanism for affixing the grip extension to the case. The grip extension may be utilized in the same fashion with the same functionality of the grip extension discussed above in other embodiments. Specifically, controls for the camera of the mobile phone may be available on the grip extension. For example, the grip extension may include a button 410 for controlling the shutter release of the camera. Other control inputs may also be utilized on the grip extension. FIG. 8 is a top view of the grip extension of FIG. 7 detached from the camera case 406.

Although the present invention has been illustrated for use with mobile phones, the present invention may be used with any electronic device utilizing a camera, such as a smart digital device (e.g., mobile phone, digital storage device, pocket camera, portable touch screen device, etc.). For example, a grip extension may be attachable to a small sized tablet. Thus, the present invention is not limited to mobile phones.

For all the embodiments, the mobile phone or other electronic device is fully functionally while utilizing the grip attachment. Furthermore, the optional lanyard may include an adjustable strap lock enabling the lanyard to be used as a wrist strip to allow the user to securely carry the mobile phone or electronic device.

The present invention provides many advantages over existing cases. The present invention provides an easily attached and detachable grip support to enable the user of a mobile phone to easily grasp the mobile phone with one hand. The present invention is particularly useful for taking photographs or video with the mobile phone. The present invention may include external controls to control various camera features of the mobile phone, such a shutter release button. Thus, the user may utilize the camera while simultaneously controlling the camera with one hand.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A grip attachment for an electronic device, the grip attachment comprising:
   a main body;
   an enlarged grip extension attached to first end of the main body, the enlarged grip extension sized and shaped to enable a user's hand to hold the grip extension and attached electronic device with one hand; and means for affixing the grip extension to an electronic device, the means for affixing the grip extension located on a second end of the main body;

wherein the grip attachment includes an external control located on an outer surface of the grip attachment for activating a camera control of the electronic device, the external control having a shutter release button for capturing an image by a camera of the electronic device.

2. The grip attachment according to claim 1 wherein the means for affixing the grip extension to an electronic device includes a locking mechanism for directly affixing the grip attachment to the electronic device.

3. The grip attachment according to claim 1 wherein the means for affixing the grip extension to an electronic device includes a locking mechanism for attaching the attachment grip to a portion of an electronic device protective case.

4. The grip attachment according to claim 1 wherein the grip attachment is affixed to a protective case surrounding the electronic device.

5. The grip attachment according to claim 3 wherein the grip attachment includes a locking tab sized and shaped to lock into position with a tab opening of the case, whereby the locking tab locks the grip attachment in place with the protective case when positioned within the tab opening of the protective case.

6. The grip attachment according to claim 5 wherein the second end of the grip attachment includes a slot end for sliding the attachment grip onto an upper portion of the electronic device.

7. The grip attachment according to claim 1 wherein the second end includes a connector for interfacing with a connector of the electronic device.

8. The grip attachment according to claim 1 wherein the external control controls zoom of an image captured by a camera of the electronic device.

9. The grip attachment according to claim 1 wherein the main body includes a means for affixing a tri-pod to the grip attachment.

10. The grip attachment according to claim 1 wherein the grip extension includes an interior storing a power source for the electronic device.

11. The grip attachment according to claim 1 wherein the main body includes a pass through connection to allow a connection to the electronic device without removing the grip attachment.

12. The grip attachment according to claim 1 wherein the main body includes an opening to enable passage of sound to and from the electronic device.

\* \* \* \* \*